United States Patent [19]

Maier

[11] 4,137,901
[45] Feb. 6, 1979

[54] SOLAR ENERGY COLLECTING AND TRAPPING APPARATUS FOR HOME HEATING OR COOLING

[76] Inventor: Henry B. Maier, 6 Sealey Ave., Hempstead, L. I., N.Y. 11550

[21] Appl. No.: 756,473

[22] Filed: Jan. 3, 1977

[51] Int. Cl.² .............................................. F24J 3/02
[52] U.S. Cl. .............................. 126/271; 203/DIG. 1
[58] Field of Search ............... 126/270, 271; 237/1 A; 202/234, 83; 203/DIG. 1, 10; 206/45.34; 220/4 R, 4 F, 82

[56] References Cited

U.S. PATENT DOCUMENTS

| 2,661,891 | 12/1953 | Arranga et al. | 206/45.34 X |
|---|---|---|---|
| 2,814,381 | 11/1957 | Stevick | 206/45.34 |
| 3,161,193 | 12/1964 | Rowekamp | 126/271 |
| 3,314,415 | 4/1967 | Rowekamp | 126/271 |
| 3,351,538 | 11/1967 | Andrassy | 202/234 |
| 3,397,117 | 8/1968 | Smith et al. | 126/271 X |
| 3,428,529 | 2/1969 | Gumucio | 202/234 X |
| 3,655,517 | 4/1972 | Hensley, Jr. et al. | 202/234 |
| 3,875,925 | 4/1975 | Johnston | 202/234 X |
| 3,986,936 | 10/1976 | Rush | 202/234 |

FOREIGN PATENT DOCUMENTS 2503251  7/1976  Fed. Rep. of Germany ........... 202/234

Primary Examiner—William F. O'Dea
Assistant Examiner—Larry Jones

[57] ABSTRACT

The solar energy collecting and trapping apparatus herein includes a pan with upstanding reflecting side walls and a black bottom, the pan being covered by a reflecting panel and a transparent front panel, whereby the sun energy incident in the apparatus will be trapped by the several reflectors in the body of fluid in the pan.

2 Claims, 4 Drawing Figures

SOLAR ENERGY COLLECTING AND TRAPPING APPARATUS FOR HOME HEATING OR COOLING

Field of the Invention

The present invention relates generally to a solar energy utilizing apparatus and, more particularly, it relates to a solar energy collecting apparatus of the greenhouse type which is reliably capable of collecting a maximum amount of the incidant solar energy.

Background of the Invention

Man has always been fascinated by the tremendous energy output of the sun and has spent a great deal of effort in the past to utilize such energy. Most frequent application was given to the so-called greenhouse type solar energy converters which are well-known to include a pair of slanted glass roofs which expose the top of the greenhouse contantly to the incident solar energy.

A more effective utilization of the solar energy has been all along sought after and a large number of improvements have been propsed, such as exemplified by U.S. Pat. No. 3,399,664; 3,946,721; 3,951,129 and 3,965,887. From the aforementioned exemplified background one may see that premium effort has been given to the utilization of the solar energy for heating of homes.

One may also appreciate that the problem of collecting the solar energy mainly lies not in the manner or method of collecting the same, but in its retention.

Summary of the Invention

It is, therefore, an object of the present invention to provide an improved solar energy collecting and trapping apparatus which is capable of reliably collecting and trapping the solar energy incident thereto for further utilization thereof in home heating or air conditioning.

It is a further object of the present invention to provide a solar energy collecting and trapping apparatus of the abovenoted type which is simple to manufacture by methods of mass production.

It is still another object of the present invention to provide a solar energy collecting and trapping apparatus of the above-noted type which is adapted to retain the trapped solar heat even under severe climatic conditions.

Brief Description of the Drawing

The present invention will become more readily apparent from the following description of preferred embodiments thereof shown in the accompanying drawings, in which.

DESCRIPTION OF THE PREFERRED EMBODIMENTS

Figure 1:
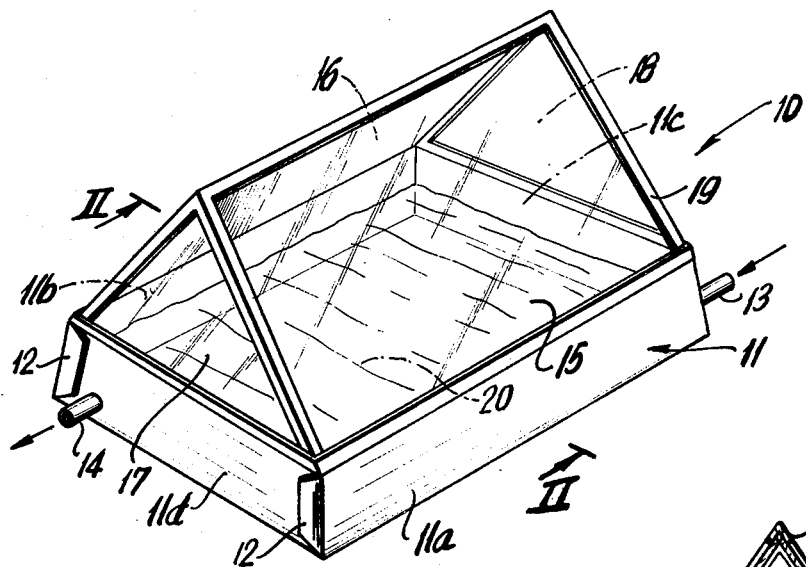
FIG. 1 illustrates an embodiment of the present invention, in perspective view.

In order to simplify the description and more clearly present the invention to the reader, like elements in the figures will be identified by the same reference characters.

Figure 2:
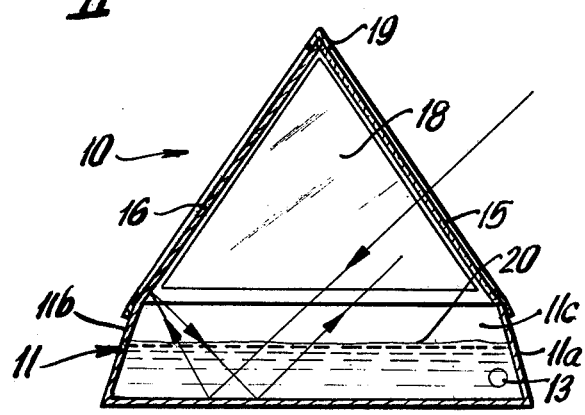
FIG. 2 is a sectional view along section II—II of the apparatus shown in FIG. 1.

With reference to FIGS. 1 and 2 it is noted that the solar energy collecting and trapping apparatus 10 which can be mounted on the top of a flat-roofed house or on a ledge of an existing house or on a separately standing platform includes a pan member 11 which has, for illustrative purposes, a rectangular base having four side walls 11a, 11b, 11c and 11d. The side walls in the present embodiment are somewhat slanted inwardly in order toaid the apparatus in the trapping of the solar energy. The top portion of the apparatus includes a front transparent panel 15 and a back reflecting surface 16.

The pan 11 with all its side walls and the back reflecting panel 16 can be stamped out in a single piece from a sheet metal or aluminum which is then highly polished on the side walls and in the area of the reflector 16 so that when assembled with the flaps 12 and joined in a tighly sealed fashion with panel 15, the solar energy incidant, as shown in FIG. 2, will be reflected by the reflector panel 16 back into the body of water 20 and any dispersed light which may become incident on the side walls 11a–11d becomes also reflected back into the body of water 20 due to the reflecting capability also of the side walls. It is also noted that the triangular end windows 17 and 18 are made also transparent so that radiation of the solar energy should not be restricted only to the front panel 15. The front panel 15 and the side windows 17 and 18 can be conveniently set in a frame 19.

The body of water 20 is fed into the trapping apparatus 10 through an input stub 13 in its cold state or in a prewarmed state if several units are serially or otherwise connected or if the previously heated water is recirculated and, is removed through an output stub 14 to the user units or to the next-in-line serially. The moving of the fluid through the apparatus 10 can be had by force of gravitation in which case the unit is mounted slightly slanted. Of course pumps with automatically opening and closing valves controlled by temperature sensors can be incorporated as additional features. The body of fluid 20 can be either water or a glycol-water solution which is more efficient in the heat absorption of the solar energy. The units 10 are placed in a stationay manner on a flat roof on a ledge of an existing house or on a separately standing platform and fixed in a preferred direction which receives the most sun throughout the day during any season of the year.

In order that the unit 10 would efficiently retain the trapped solar energy in the body of trapping fluid 20, it should be insulated on its pan portion 11 all around and on its bottom and along the reflector 16. It is also noted that the bottom of the pan portion 11 should be non-reflective by being blackened, matted or dulled.

It is further noted that the front panel 15 can be made of glass or in order to improve the heat retention within the unit 10, it can be made from a synthetic transparent material, such as plexiglass, etc. or a combination of both glass and a synthetic transparent material especially if the unit is used in cold climate.

Figure 3:
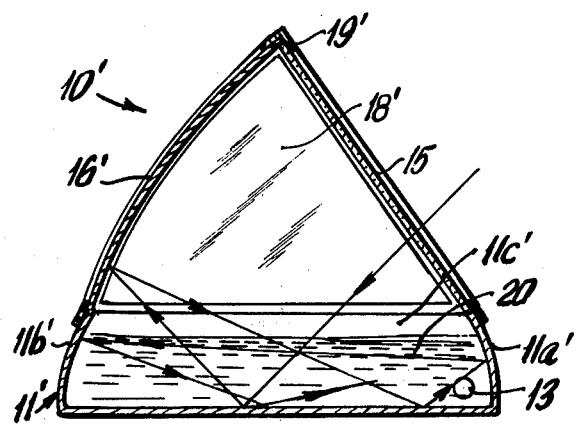
FIG. 3 illustrates a different embodiment of the solar energy collecting and trapping apparatus according to the present invention, in sectional view.

With reference to FIG. 3 illustrating a further embodiment of the present invention it is noted that the essential elements of the unit 11' are similar to those in FIGS. 1 and 2, however, in order to further improve the heat trapping effect of the unit, the sidewalls 11a'-11d' are made curved, preferably parabolic with their focal points located toward the center and the bottom of the pan portion 11' and in the body of the fluid 20. As can be seen also in FIG. 3 the reflector panel 16' has been made also curved, preferably parabolic with its focal point located within the body of the fluid 20. The front panel 15 can be made similarly as in the above embodiment of FIGS. 1 and 2.

It is noted in connection with the embodiments shown in FIGS. 1-3 that in the event it is desired that the unit 10 or 10' be made from a molded plastic material which cannot be polished, then the side walls 11a-11d and 11a'-11d' and also the reflector panels 16 and 16' should be coated with a reflecting material in order to lend them a mirror-like surface. Such mirror coating is widely available commercially in spray-type forms or in an adhesive form. In the event of a molded construction for the units of FIGS. 1-3 the front panel 15 and the side windows 17 and 18 which are also present but not shown in the side-view illustration of FIG. 3 can be molded structures.

Figure 4:
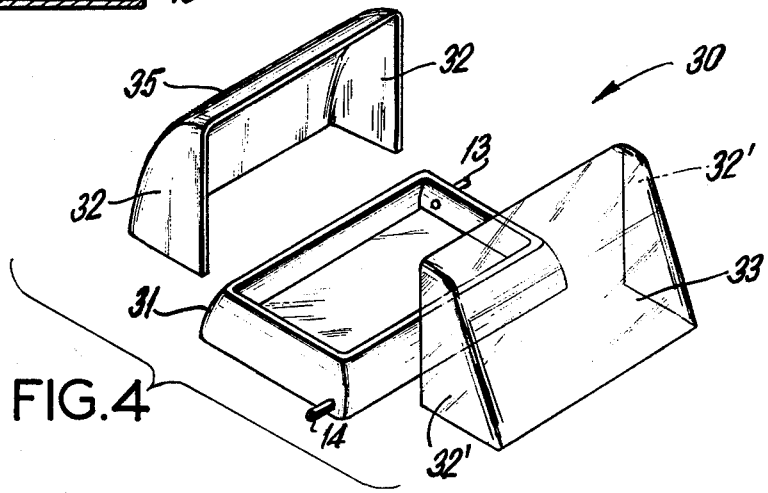
FIG. 4 illustrates a still further embodiment of the solar energy collecting and trapping apparatus according to the present invention.

With reference to FIG. 4 it is noted that it represents what it can be considered as the mass-produced version of the solar energy collecting and trapping unit 30 by providing a preferably single molded pan portion 31 with curved side walls similar to those illustrated in FIG. 3 and provided with the mirror-like inside surfaces on the side walls thereof and a curved reflector unit 35 and a transparent front unit 33. As can be seen in FIG. 4, the flanges 32 of the reflector 35 are shaped to cooperate and snugly fit with corresponding flanges 32' of the front transparent panel 33 so that an air tight unit 30 is formed when the front panel 33 is snugly slid over the pan portion 31. The reflector 35 is also provided with a mirror-like inside surface and is also made curved, preferably parabolic similar to the reflector 16' of the embodiment shown in FIG. 3. Insulation of the unit 30 is also provided according to the climatic exposure where the unit may be used.

As can be seen and understood from the foregoing disclosure, an improved solar energy collecting and trapping unit in various embodiments have been described which is very reliable in the collection and trapping of the solar energy and in its retention.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A solar energy collecting and trapping apparatus comprising a pan member having upstanding side wall means and a non-reflecting bottom portion for accommodating therein a body of fluid material inputted thereto and removed therefrom at a predetermined rate, a front panel means made from a transparent material for permitting the sun rays to enter said body of fluid, and a reflector panel means shaped and positioned with respect to said front panel means for returning any dispersed radiation energy back into said fluid body, wherein said pan member is formed as a singly molded unit, said reflector panel means being snugly fitable over said pan member when in operative position, said frontal panel means is being formed as a singly molded unit snugly fitable when in operative position over said pan member, wherein said side wall means are parabolic surfaces and wherein said reflector means is a parabolic surface in shape.

2. A solar energy collecting and trapping apparatus comprising a pan member having upstanding side wall means and a non-reflecting bottom portion for accommodating therein a body of fluid material inputted thereto and removed therefrom at a predetermined rate, a front panel means made from a transparent material for permitting the sun rays to enter said body of fluid, and a reflector panel means shaped and positioned with respect to said front panel means for returning any dispersed radiation energy back into said fluid body, wherein said side wall means are curved surfaces and wherein said reflector means is a curved surface in shape with their focal points lying in the body of the fluid.

* * * * *